F. MÜLLER.
METHOD OF MAKING MILLING CUTTERS.
APPLICATION FILED DEC. 26, 1918.
1,348,297.
Patented Aug. 3, 1920.
2 SHEETS—SHEET 1.
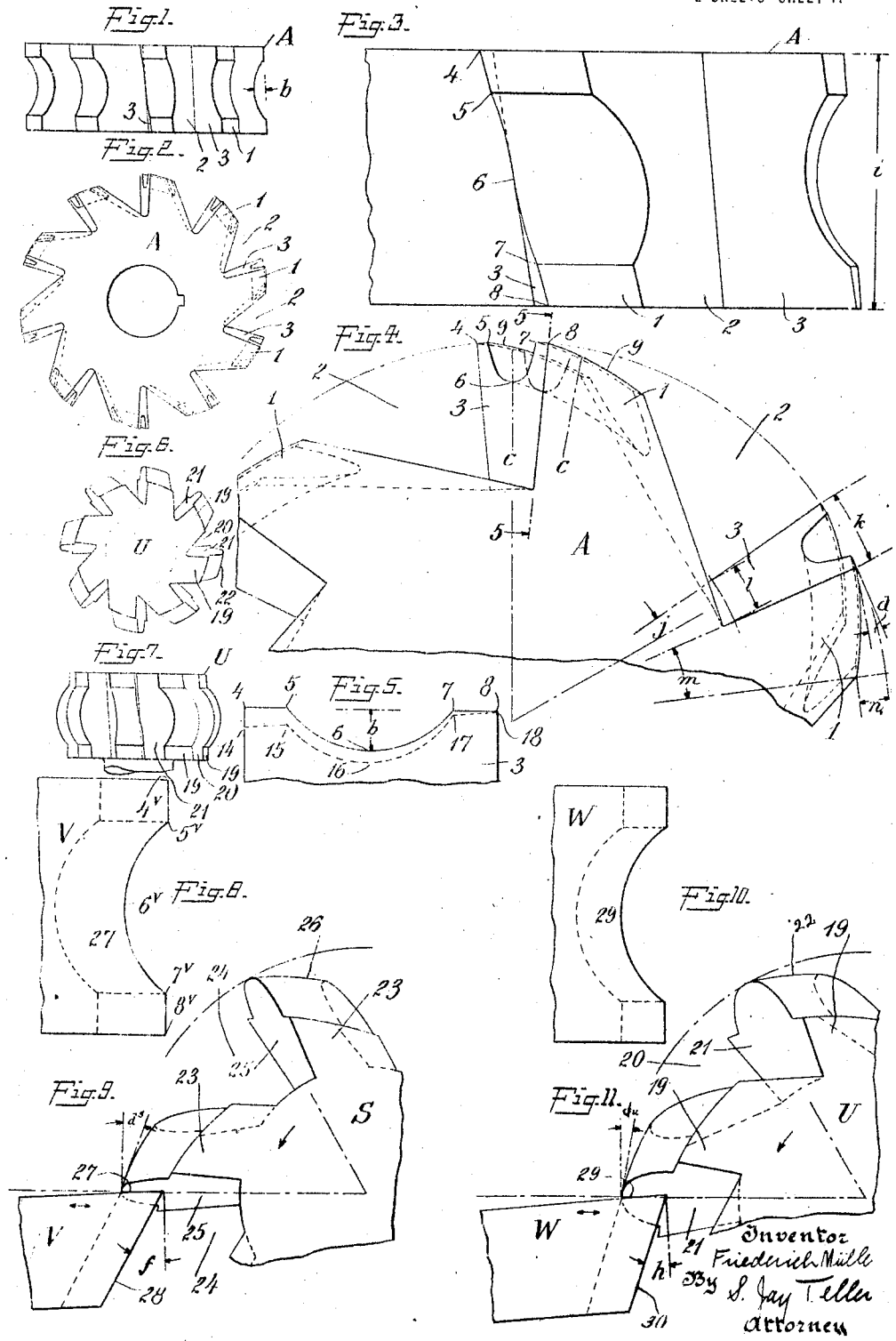

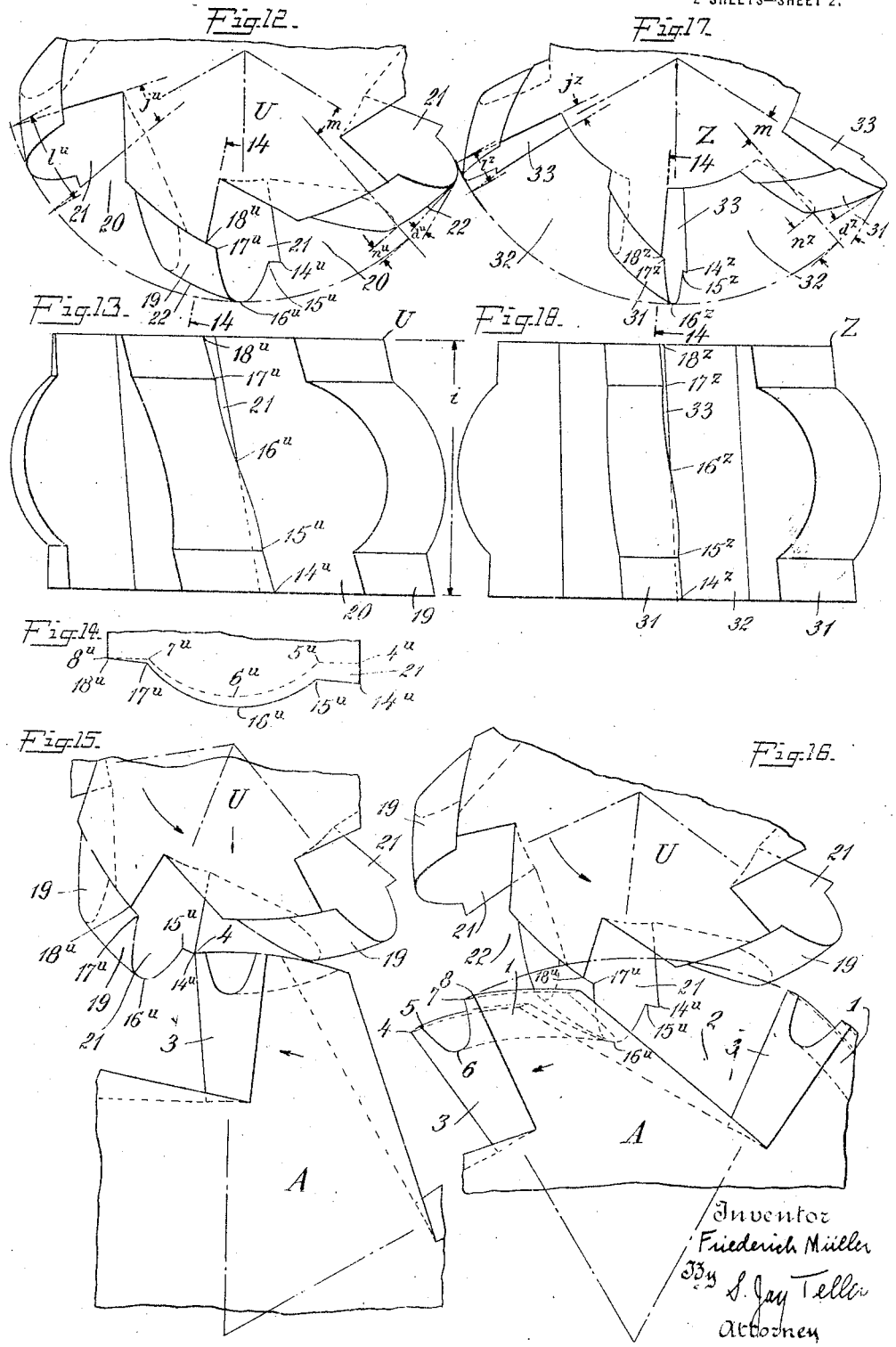

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,297.  Specification of Letters Patent.  Patented Aug. 3, 1920.

Original application filed May 1, 1918, Serial No. 231,796. Divided and this application filed December 26, 1918. Serial No. 268,351.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutter being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed on even date herewith.

In my copending application for methods of making milling cutters, Serial No. 268,350, filed on even date herewith, I have presented a method of making cutters embodying the invention presented in my said application, Serial No. 268,349, and I have also shown several variations of the said method or alternate ways of practising it. In the present application, which is a division of my abandoned application for milling cutters and methods of making, Serial No. 231,796, filed May 1st, 1918, I present and specifically claim one of the said variations of the method presented in the said application Serial No. 268,350. The specific method herein set forth is under some circumstances preferable to the method presented in the said application as being the one ordinarily preferred.

In order that the method may be clearly understood, I have shown in the accompanying drawings a cutter embodying the invention set forth in the aforesaid application, Serial No. 268,349, and I have illustrated two ways in which the method may be practised. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figures 1 and 2 are plan and end views respectively of a formed milling cutter such as may be made in accordance with the invention.

Figs. 3 and 4 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.

Fig. 5 is a diagrammatic view illustrating certain features of the cutter shown in Figs. 3 and 4.

Figs. 6 and 7 are end and bottom views respectively of a preliminary milling cutter which may be used for milling the final milling cutter shown in Figs. 1 and 2.

Fig. 8 is a plan view of a lathe tool adapted to be used for shaping the preliminary cutter.

Fig. 9 is an enlarged fragmentary diagrammatic end view of a preliminary cutter somewhat different from that shown in Figs. 6 and 7, but which may also be used for milling the final milling cutter. The cutter is shown as having a smaller number of teeth and as having increased inclination and relief in conformity with the increased inclination and relief shown in Figs. 3 and 4.

This view also illustrates the lathe tool shown in Fig. 8 in operative relation to the preliminary cutter.

Figs. 10 and 11 are views similar respectively to Figs. 8 and 9 but illustrating the milling cutter shown in Figs. 6 and 7 and a different lathe tool.

Figs. 12 and 13 are enlarged diagrammatic end and bottom views respectively of the preliminary milling cutter shown in Figs. 6, 7 and 11. The cutter is shown as having a smaller number of teeth and as having increased inclination and relief in conformity with the increased inclination and relief shown in Figs. 3 and 4.

Fig. 14 is a diagrammatic view illustrating certain features of the cutter shown in Figs. 12 and 13.

Fig. 15 is a diagrammatic view illustrating the preliminary cutter shown in Figs. 12 and 13 in use for milling a blank for the final cutter, the milling operation having been started but not finished.

Fig. 16 is a view similar to Fig. 15 but illustrating the blank completely milled.

Figs. 17 and 18 are views similar respectively to Figs. 12 and 13, but illustrating a different preliminary cutter.

In order that the method may be clearly understood I will first describe a cutter such as can be made in accordance with the invention. Referring particularly to Figs. 1 to 5 of the drawings, it will be seen that I have shown a cutter A which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, each tooth 1 is generally helical in form and each cutting face 3 conforms to a helicoid. As illustrated, the helicoid is one formed by a generatrix following the axis of the cutter and also following a helix on a cylinder concentric with the axis thereof, the helicoid in this case being radial. The teeth and the cutting faces may be inclined in either direction and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. The cutter shown is adapted for cutting a contour consisting of straight end portions and a convex central portion conforming to a circular arc and having a height $b$. It will be understood that this particular contour has been selected merely by way of example and that the contour can vary in any practical way that may be desired, the method being particularly applicable however for making a cutter having a curved contour.

The outer edge of each cutting face 3 has an outline which is adapted to cut the predetermined contour when the cutter is rotated, this outline of the cutting face following the helicoidal surface thereof. In other words the outer cutting edge of each face is of such form that the projection of the said edge about the axis of the cutter upon an axial plane of intersection is the same as the predetermined contour to be cut. This will be more clearly understood from the diagrammatic views in Figs. 3 and 4. For the particular contour illustrated, the four points 4, 5, 7 and 8 on the outline of the cutting face are all at equal distances from the axis of the cutter; the central point 6 is at a distance from the axis which is less by the distance $b$; and all other points along the outline are at their respective correct distances from the center so that when the cutter is rotated they will define the correct predetermined contour, as shown by full lines in Fig. 5. This relationship of the several points along the outline of the cutting face obtains notwithstanding the fact that the cutting face is a warped or helicoidal surface.

Each tooth of the cutter is relieved along lines 9 extending backward and inward from the outline of the cutting face, these relief lines forming a continuous surface or continuous surfaces which extend from end to end of the cutter. The relief lines are properly constructed notwithstanding the variations in radius at different points along the said outline and notwithstanding the variations in angular position resulting from the warped or helicoidal cutting face. Preferably the relief lines 9 are maintained in similar relationship to each other as they extend backward and inward, the lines conforming to spirals of Archimedes. The result is that each tooth of the cutter, at any axial plane of intersection, such as 5—5, has a distorted shape, as shown by dotted lines in Fig. 5. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the inclined or helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

When the relief lines 9 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, such as $c$—$c$, back of an initial cutting face 3, and similar to the said face, the same effective contour will be found. Therefore if the teeth are ground on their front faces to helicoids which are the same as the helicoids of the initial cutting faces the effective contour will remain the same.

Taking up now the method of making the milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide a distorted shape which will enable it to cut a correct contour.

In accordance with the general method set forth in my aforesaid copending application, Serial No. 268,350, the shape of the cutter to be made is formed by means of a preliminary milling cutter, this preliminary cutter preferably acting directly on the final cutter. Figs. 6 and 7 show a preliminary milling cutter U such as may be used. The cutter U is formed with teeth 19 having grooves 20 between them. As set forth in the said application, each tooth 19 of the preliminary cutter is formed with a helicoidal cutting face 21 having a longitudinal pitch bearing a predetermined ratio to the longitudinal pitch of the helicoids of the final cutter A; and each tooth is provided with relief lines 22 having a degree of relief bearing the same predetermined ratio to the degree of relief of the teeth of the final cutter. In the said application I have stated that it is in many cases more convenient to make the pitches of the helicoids the same and to make the reliefs the same, but I also made it clear that there could be variation from this.

Different circumstances may make it desirable to depart from the uniformity of pitch and relief that I have referred to. By way of example I will illustrate one condition that may lead to such a departure. In Fig. 8 I have shown diagrammatically a cutter S having teeth 23 with grooves 24 between them and having helicoidal cutting faces 25. For clearness of illustration the inclination of the cutting faces and the relief are increased as in Figs. 3 and 4. The cutting faces 25 are constructed with a longitudinal pitch the same as that of the helicoidal faces 3 of the teeth of the final cutter A. The teeth 23 are provided with relief lines 26 which are constructed with the same degree of relief as the relief lines 9 of the teeth of the cutter A.

The preliminary cutter can most conveniently be made by means of a lathe tool such as V, shown in Figs. 8 and 9, this tool being used in a relieving lathe. The lathe tool V is formed with its top cutting face 27 having a contour $4^v$, $5^v$, $6^v$, $7^v$, $8^v$ which is the same as the effective contour 4, 5, 6, 7, 8 of the teeth of the final cutter A. In order to make a small correction, as explained in detail in my aforesaid application, the tool V is preferably set with its top cutting face in a plane at an angle to a plane through the axis of the preliminary cutter, as indicated in Fig. 8. When the preliminary cutter S is being formed, it is rotated in the direction of the arrow, the tool V being moved in and out, as indicated by the horizontal arrow, so as to follow the proper relief lines 26. Inasmuch as the relief lines 26 conform to the same spirals as the relief lines 9 of the cutter A, it is obvious that the actual angle of intersection between the relief lines and the circumferential lines is considerably greater for the cutter S because of the smaller radius thereof. For the cutter A the relief angle is $d$ as shown in Fig. 4, and the cutter S has a considerably larger angle $d^s$. The lathe tool V must have its front face 28 formed at an angle $f$, somewhat greater than the angle $d^s$, so as to properly clear the inclined relief lines 26. With the cutter S provided with relatively great relief, as shown in Fig. 8, the angle $f$ must be large, and in fact, the inclination of the front face 28 of the tool may be so great as to seriously interfere with the proper support of the cutting edge of the tool. When this is the case the tool V can be modified by reducing the amount of relief on the preliminary cutter.

Fig. 10 is a view similar to Fig. 8, but showing the cutter U. The helicoidal front cutting faces 21 of the teeth 19 have a longitudinal pitch which is considerably less than the longitudinal pitch of the helicoidal faces 3 of the teeth of the cutter A. As shown this pitch of the helicoidal faces 21 is exactly one-half the pitch of the helicoidal faces 3. The degree of relief of the lines 22 is considerably less than the degree of relief of the cutter A. When the pitch of the helicoidal cutting faces is exactly one-half, as shown, the degree of relief is also exactly one-half, the relief angle being $d^u$.

The preliminary cutter U can be made by means of a lathe tool W, which has a top cutting face 29 with exactly the same contour as that of the tool V. The tool W differs, however, in that the angle $h$ of its front face 30 is considerably less than the angle $f$ of the front face 28 of the tool V. This is made possible because of the considerably smaller relief angle $d^u$ on the cutter U. It will be seen that by reducing the pitch and the relief as shown, it becomes possible to use a better and more satisfactory initial lathe tool.

The cutter U is more completely shown in Figs. 12 and 14. Each tooth of the cutter U has at any longitudinal plane of intersection such as 14—14 a shape which is the same or approximately the same as the predetermined contour to be cut by the cutter A. This is indicated by dotted lines in Fig. 14, the points $4^u$, $5^u$, $6^u$, $7^u$ and $8^u$ corresponding respectively to the points 4, 5, 6, 7 and 8 on the effective contour of the final cutter A.

As already stated, the helicoidal cutting face 21 of each tooth 19 has a longitudinal pitch less than that of the helicoidal faces 3 of the teeth of the final cutter. The relief of each tooth is also less than that of the relief of the teeth of the final cutter. The ratio between the two pitches is the same as the ratio between the two reliefs, and as shown each ratio is one to two. The pitch of the helicoids of the preliminary cutter is one-half that of the helicoids of the final cutter and the relief of the teeth is also one-half.

Referring back to Figs. 3 and 4 it will be noted that for a given length $i$ along the cutter A there is a corresponding angular advance $j$. The actual linear advance of one end of the cutting face with respect to the other at the outside radius is represented by $k$. At a smaller radius the angle $j$ is the same but there is a smaller linear advance $l$. For the same length $i$ along the cutter U there is an angle $j^u$ which is twice the angle $j$, and there is a linear advance $l^u$ which is twice the advance $l$ at the same radius on the cutter A. It will be noted that for an angle $m$ of the cutter A there is a decrease in radius $n$, the relief angle being $d$ as already noted. For the same angle $m$ there is a decrease in radius $n^u$, which is one-half the decrease $n$ for the cutter A. The relief angle $d^u$ is less than the angle $d$ and is also less than the angle $d^s$ of the cutter S as already noted.

As the result of providing the preliminary cutter U with helicoidal cutting faces and with the relief as shown and described, the contour of each cutting face is distorted, the extent of distortion being the same in amount as that of the final cutter at an axial plane of intersection as shown by dotted lines in Fig. 5. As shown by full lines in Fig. 14 the distorted contour of the cutter U has points $14^u$, $15^u$, $16^u$, $17^u$ and $18^u$ corresponding respectively to the points $4^u$, $5^u$, $6^u$, $7^u$ and $8^u$. The several points $15^u$, $16^u$, $17^u$ and $18^u$ to the right of the point $4^u$ or $14^u$ are spaced outward from the respective points $5^u$, $6^u$, $7^u$ and $8^u$ by progressively increasing distances. This distorted contour is the same irrespective of the actual pitch and relief, provided the pitch and relief are always in the same ratio to the pitch and relief of the final cutter.

In Figs. 15 and 16 I have shown the cutter U being used for shaping a blank to form the cutter A. It will be understood that the cutter U is rapidly rotating in the direction indicated by the arrow thereon; that the blank is slowly rotating in the direction indicated by the arrow thereon; and that relative approaching and receding movements are effected between the cutter and the blank in timed relation to the blank rotation to provide the required relief on the final cutter. These relieving movements are preferably effected by moving the axis of the cutter bodily toward the axis of the blank, as indicated by the vertical arrow, and then bodily away from the axis of the blank in the opposite direction. Preferably the downward or inward relieving movement is so timed that the resulting relief on the blank will conform to spirals of Archimedes. The cutter U is moved slowly downward during the cutting of each tooth and then is rapidly moved upward between the teeth to position it for the cutting of the next tooth.

As shown in Fig. 15, the cutter U and the blank have been so adjusted that the teeth of the rotating cutter will mill the initial point 4 of the tooth of the blank A to the required distance from the axis. The downward movement of the cutter U in timed relation to the slow rotation of the blank causes it to take a cut which gradually increases in depth at the successive points back of the point 4. As the cutter blank A is slowly turned and as the cutter U is fed downward in accordance with the relief, the parts move to the position shown in Fig. 16, the distorted shape of the cutter U exactly compensating for the distortion which would otherwise take place in the shape of the cutter A. The cutter U shapes the cutter A with the several points 4, 5, 6, 7 and 8 all at the proper distances from the axis, so that the cutter A when used will generate the true contour, as shown by full lines in Fig. 5.

In order to illustrate the fact that the pitch and relief of the preliminary cutter need not be less than those of the final cutter, but may in fact be greater, I have shown a different preliminary cutter Z in Figs. 17 and 18. The cutter has teeth 31 with grooves 32 between them, and the teeth are provided with helicoidal cutting faces 33. At an axial or approximately axial longitudinal plane of intersection such as 14—14, the cutter has a shape which is the same as the shape $4^u$, $5^u$, $6^u$, $7^u$, $8^u$ of the cutter U as shown by dotted lines in Fig. 14. The helicoidal cutting face 33 of each tooth 31 has a longitudinal pitch greater than that of the helicoidal faces 3 of the teeth of the final cutter. The relief of each tooth is also greater than that of the teeth of the final cutter. The ratio between the two pitches is the same as the ratio between the two reliefs, and as shown each ratio is four to three. The pitch of the helicoids of the preliminary cutter is one and one-third times that of the helicoids of the final cutter and the degree of relief of the teeth is also one and one-third times that of the teeth of the final cutter.

For a length $i$ along the cutter Z there is an angle $j^z$ which is three-fourths the angle $j$, and there is a linear advance $l^z$ which is three-fourths the advance $z$. For the angle $m$ there is a decrease in radius $n^z$ which is four-thirds or one and one-third times the decrease $n$. The relief angle is $d^z$, this being greater than the angle $d$ of the cutter A and also greater than the angle $d^s$ of the cutter S.

Each cutting face of the cutter Z has a distorted effective contour $14^z$, $15^z$, $16^z$, $17^z$, $18^z$ which is the same as the contour $14^u$, $15^u$, $16^u$, $17^u$, $18^u$ of the cutter U, as shown by full lines in Fig. 14. The cutter Z can be used in the same way as the cutter U, as shown in Figs. 15 and 16.

What I claim is:

1. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch different from the longitudinal pitch of the helicoidal cutting faces of the final cutter and provided with a degree of spiral relief different from the degree of spiral relief of the teeth of the final cutter, the ratio of the two pitches being the same as the ratio of the two degrees of reliefs, and in forming the shape of the relieved final milling cutter from the said preliminary cutter whereby the final cutter is formed with a distorted shape at axial planes of intersection but is adapted to cut the correct contour when rotated.

2. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch different from the longitudinal pitch of the helicoidal cutting faces of the final cutter and provided with a degree of spiral relief different from the degree of spiral relief of the teeth of the final cutter, the ratio of the two pitches being the same as the ratio of the two degrees of relief, and in milling the final cutter wit the said preliminary cutter while securing .ne desired relief by effecting relative approaching and receding movements in correct relation to the helicoidal cutting faces whereby the final cutter is formed with a distorted shape at axial planes of intersection but is adapted to cut the correct contour when rotated.

3. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch smaller than the longitudinal pitch of the helicoidal cutting faces of the final cutter and provided with a degree of spiral relief smaller than the degree of spiral relief of the teeth of the final cutter, the ratio of the two pitches being the same as the ratio of the two degrees of reliefs, and in forming the shape of the relieved final milling cutter from the said preliminary milling cutter whereby the final cutter is formed with a distorted shape at axial planes of intersection but is adapted to cut the correct contour when rotated.

In testimony whereof I hereto affix my signature.

FRIEDERICH MÜLLER.